(No Model.)
J. PAAR.
CHECK HOOK FOR HARNESS.
No. 244,653. Patented July 19, 1881.
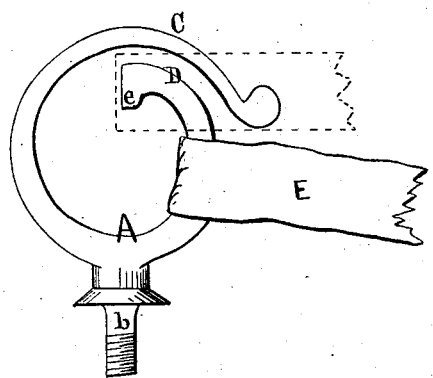
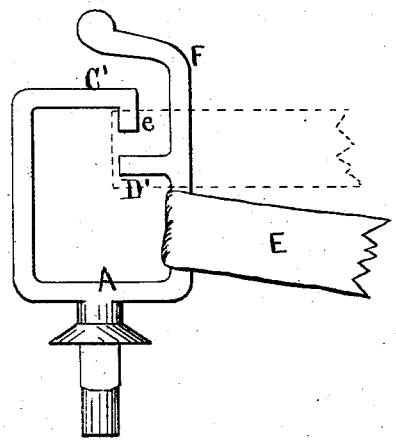
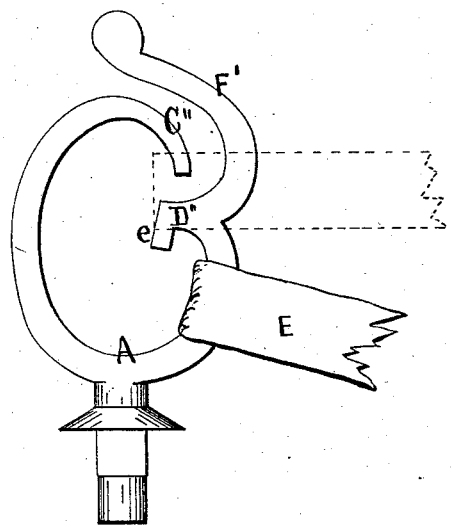
WITNESSES:
Irving Dickinson.
John F. Acker.
INVENTOR,
John Paar
By
Daniel A. Burr
Atty

UNITED STATES PATENT OFFICE.

JOHN PAAR, OF NEW YORK, N. Y.

CHECK-HOOK FOR HARNESS.

SPECIFICATION forming part of Letters Patent No. 244,653, dated July 19, 1881.

Application filed December 27, 1880. (No model.)

*To all whom it may concern:*

Be it known that I, JOHN PAAR, a citizen of the United States, and a resident of the city, county, and State of New York, have invented certain new and useful Improvements in Harness Check-Hooks; and I do hereby declare that the following is a full, clear, and exact description thereof, reference being had to the accompanying drawings, and to the letters of reference marked thereon, making a part of this specification.

This invention relates to an improvement in hooks for holding the check-rein in the harness of a horse, and has for its object preventing the detachment or release of the rein from the hook by the movement of the horse's head.

It consists in so widening the extremity of the one or the other arm or guard of a check-hook by means of an offset at that point as to produce an extended flat surface above or below the opening in the hook, which shall not only serve to arrest an outward movement of the rein inserted therein, but will prevent the edge of the rein from accidentally doubling or turning flatwise, as is required to enable it to slip out through said opening.

In the accompanying drawings, Figure 1 is an elevation of my improved check-hook in its simplest form, and Figs. 2 and 3 elevations of modified forms thereof.

A is the body of the check-hook, designed to be secured to the harness-saddle by a threaded shank, b, in the customary manner; C, its upper curved arm; D, its inner or lower arm or guard, and E a check-rein secured by the hook.

In the construction of the form of hook shown in Fig. 1 the upper arm, C, is extended over the end of the lower arm, D, and an offset, e, is formed upon the end of said arm D, to project inwardly therefrom in a direction transverse to that of the arm and present a comparatively extended flat surface at the extremity of said arm, as illustrated in the drawings.

The check-hook thus constructed is designed to be secured upon the harness with its opening toward the horse's head, which greatly facilitates the introduction of the check-rein. The rein E is readily slipped in or out between the outer and inner arms, C D, flatwise; but when it has passed into the ring it cannot of itself turn flatwise. When drawn forward, as is the case when the horse is reined up therewith, the shoulder produced by the offset e will tend to prevent the rein from slipping back and turning over the end of the inner arm of the hook; but should it be thrown back by the movement of the horse's head and up over the opening in the hook, the extended flat surface represented by the offset e prevents the rein from so turning as to permit it to slip into the opening. (See the dotted lines in the drawings.)

In the modification of my invention represented in Fig. 2 the upper or outer arm, C', is cut short above the opening in the hook, and the inner arm, D', is provided with an extension, F, which branches from the arm in front of the opening, and is curved back over the upper arm, so as to give a double turn to the passage through which the check-rein is inserted. In this case a wide flat surface, e, is formed upon the end of the upper arm, C', instead of upon the lower arm, to perform its function of preventing the edge of the rein from accidentally doubling or turning into the opening. (See dotted lines in said Fig. 2.)

In Fig. 3 a check-hook is shown having its upper arm, C'', cut short at the opening in the hook and its lower arm, D'', branched, an extension, F', therefrom passing back in front of the opening and over the end of the upper arm, C''. In this form of hook the flat-faced offset e is formed upon the inner end of the lower arm, which terminates at the opening in the hook, substantially as shown in Fig. 1, and with like effect.

The formation, as illustrated in the drawings, of a wide flat face, e, upon the one side or the other of the opening in the hook, through which the check-rein is passed in or out to perform the function, as described, of preventing the rein from accidentally doubling or turning into the opening, enables me to use the hook with its opening toward the horse's head, instead of the reverse, as is usually done; and in this position of the hook the necessity of pulling the rein back to the rear thereof is avoided and the rein much more easily hooked up.

I do not claim the use of a curved arm or guard, D, in a check-hook; but

What I claim as new, and desire to secure by Letters Patent, is—

The combination, with guard-arm of a check-hook, of an extended flat face, $e$, formed upon the inner side of the hook, adjacent to the opening therein, at an angle transverse to the direction of said opening, substantially as and for the purpose herein set forth.

In testimony whereof I have signed my name to this specification in the presence of two subscribing witnesses.

JOHN PAAR.

Witnesses:
IRVING DICKINSON,
J. F. ACKER, Jr.